(12) United States Patent
Palm

(10) Patent No.: US 6,401,603 B1
(45) Date of Patent: Jun. 11, 2002

(54) APPARATUS IN AN INFUSOR FOR A LIQUID FOOD PRODUCT

(75) Inventor: Bengt Palm, Genarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/831,021

(22) PCT Filed: Nov. 3, 1999

(86) PCT No.: PCT/SE99/01987

§ 371 (c)(1), (2), (4) Date: Jul. 17, 2001

(87) PCT Pub. No.: WO00/25596

PCT Pub. Date: May 11, 2000

(30) Foreign Application Priority Data

Nov. 4, 1998 (SE) ................................................ 9803766

(51) Int. Cl.[7] .......................... A23C 3/00; A23C 3/02; A23L 1/00; H05K 3/34

(52) U.S. Cl. ............................ 99/453; 99/452; 99/483; 99/516

(58) Field of Search .................... 99/452–455, 467, 99/470, 471, 473–476, 483, 516, 534; 426/520–522, 392, 394, 399, 406, 407; 422/26, 307; 239/419, 422–424, 432, 518

(56) References Cited

U.S. PATENT DOCUMENTS

| | | | |
|---|---|---|---|
| 3,230,095 A | * | 1/1966 | Stewart, Jr. ............... 99/454 X |
| 3,466,996 A | * | 9/1969 | Sommer ...................... 99/455 |
| 3,555,991 A | | 1/1971 | Vasilievich et al. |
| 3,771,434 A | | 11/1973 | Davies |
| 3,973,048 A | | 8/1976 | Sollerud |
| 4,160,002 A | * | 7/1979 | Janovtchik ................. 99/453 X |
| 4,161,909 A | * | 7/1979 | Wakeman .................... 99/453 |
| 4,310,476 A | | 1/1982 | Nahra et al. |
| 4,375,185 A | | 3/1983 | Mencacci |
| 4,390,350 A | | 6/1983 | Palm |
| 4,419,301 A | | 12/1983 | Nahra et al. |
| 4,432,276 A | | 2/1984 | Catelli |
| 4,787,304 A | | 11/1988 | Bronnert |
| 5,494,691 A | | 2/1996 | Sizer |
| 6,234,069 B1 | | 5/2001 | Palm |

* cited by examiner

*Primary Examiner*—Timothy F. Simone
(74) *Attorney, Agent, or Firm*—Burns, Doane, Swecker & Mathis, L.L.P.

(57) ABSTRACT

The invention relates to an apparatus in an infusor (1) for a liquid food product. The infusor (1) is of the type which includes an autoclave (2) with a conical bottom (3). The autoclave (2) has an inlet (4) for the product located in its upper region, with a device for dividing the product into small droplets (6). The infusor also has an outlet (10) for the product located in the lower region of the autoclave (2), as well as an inlet (11) for steam. The conical bottom (3) of the autoclave (2) is filled to the greater part by a conically shaped body (15). The remaining space (16) in the bottom (3) of the autoclave (2) consists of a buffer cell. The stay volume of the product, which consists of that product which stays in the space (16) up to a liquid level (19, 20) may be varied steplessly.

10 Claims, 4 Drawing Sheets

APPARATUS IN AN INFUSOR FOR A LIQUID FOOD PRODUCT

TECHNICAL FIELD

The present invention relates to an apparatus in an infusor for a liquid food product, of the type which includes an autoclave with a conical bottom, the autoclave having an inlet for the product located in its upper region, the inlet being disposed to divide the incoming product into the autoclave into small droplets, the infusor further including an outlet for the product located in the lower region of the autoclave, as well as an inlet for steam.

BACKGROUND ART

Heat treating food products for increased shelf life is a well-known and often employed method. The food products may, for example, be various dairy products such as milk, cream or yoghurt. The heat treatment may be put into effect in a plurality of different ways, directly or indirectly. Indirect methods are, for instance, heating using various types of heat exchangers. There are two main groups of direct methods, injection or infusion with steam. By employing a direct method, an extremely rapid heating will be obtained, which is to be sought for today since, in order to improve the flavour qualities, for instance in milk, it is many times the intention to heat the product to elevated temperatures for a brief interval of time.

The present invention relates to an apparatus in which use is made of infusion heating. Infusion entails that a finely divided liquid is heated in a steam chamber. The principle of heating a liquid, for example a liquid food, by injecting the liquid into a chamber filled with steam is known from the later part of the nineteenth century.

In principle, the infusor consists of an autoclave with a conical bottom. In the upper region of the autoclave there is an inlet for the product which is to be heat treated and there is also a device for dividing the product into small droplets which then fall through the autoclave. At the bottom of the autoclave, the droplets gather and form a liquid accumulation and finally depart from the autoclave through an outlet in its lower region. The autoclave also has an inlet for steam which may be placed in its upper region or alternatively its lower region. Regardless of the siting of the steam inlet, the purpose of the hot steam is to heat up the product droplets on their way down through the autoclave.

All modern heat treatment of food products has for its purpose, on the one hand to heat the product to a certain predetermined temperature, and on the other hand to keep the product at this temperature for a given predetermined interval of time. In connection with the heating of the product in an infusor, use is normally made of a separate buffer cell or pipe, i.e. a pipe length in direct connection with the product outlet of the autoclave. When the product leaves the autoclave, it is at a temperature close to boiling point and the displacement proper entails a pressure drop which consequently causes the product to boil. This boiling may give rise to frothing which entails a volume reduction and reduced control over how the product may be kept at a given temperature for a given interval of time. In order to prevent the product from boiling before reaching the buffer cell or pipe, the requirements of the authorities in several countries have required that a so-called lobe rotor pump be placed between the autoclave and the buffer cell, with a view to imparting a pressure increase to the product and thereby preventing boiling. A relatively expensive pump such as a lobe rotor pump is necessary, since the product is at a temperature of approximately 140–150° C.

The liquid accumulation of heated product which gathers in the conical bottom region of the autoclave causes great uncertainty in the calculation of the stay time of the product, since the relatively large volume involved makes it impossible to know how long the product stays here, and that all parts of the product have been treated for the same interval of time.

OBJECTS OF THE INVENTION

One object of the present invention is to realise a buffer cell in the infusor which gives a reliable and controlled stay time for the product. In that the buffer cell constitutes a part of the infusor, the need for an additional buffer cell is eliminated, as well as the need for any possible pump placed between the infusor and the buffer cell.

A further object of the present invention is to realise a buffer cell which may be simply regulated for different time intervals in respect of the stay time, in that the volume in the buffer cell may be varied.

SOLUTION

These and other objects have been attained according to the present invention in that the apparatus of the type described by way of introduction has been given the characterizing features that the conical bottom of the autoclave is, for the greater part, filled by a conically shaped body and that the remaining space in the bottom of the autoclave constitutes a buffer cell.

Preferred embodiments of the present invention have further been given the characterizing features as set forth in the appended subclaims.

BRIEF DESCRIPTION OF THE ACCOMPANYING DRAWINGS

One preferred embodiment of the apparatus according to the present invention will now be described in greater detail hereinbelow, with particular reference to the accompanying Drawings. In the accompanying Drawings.

The accompanying Drawings show only those parts and details essential to an understanding of the present invention.

DESCRIPTION OF PREFERRED EMBODIMENT

Figure 1:
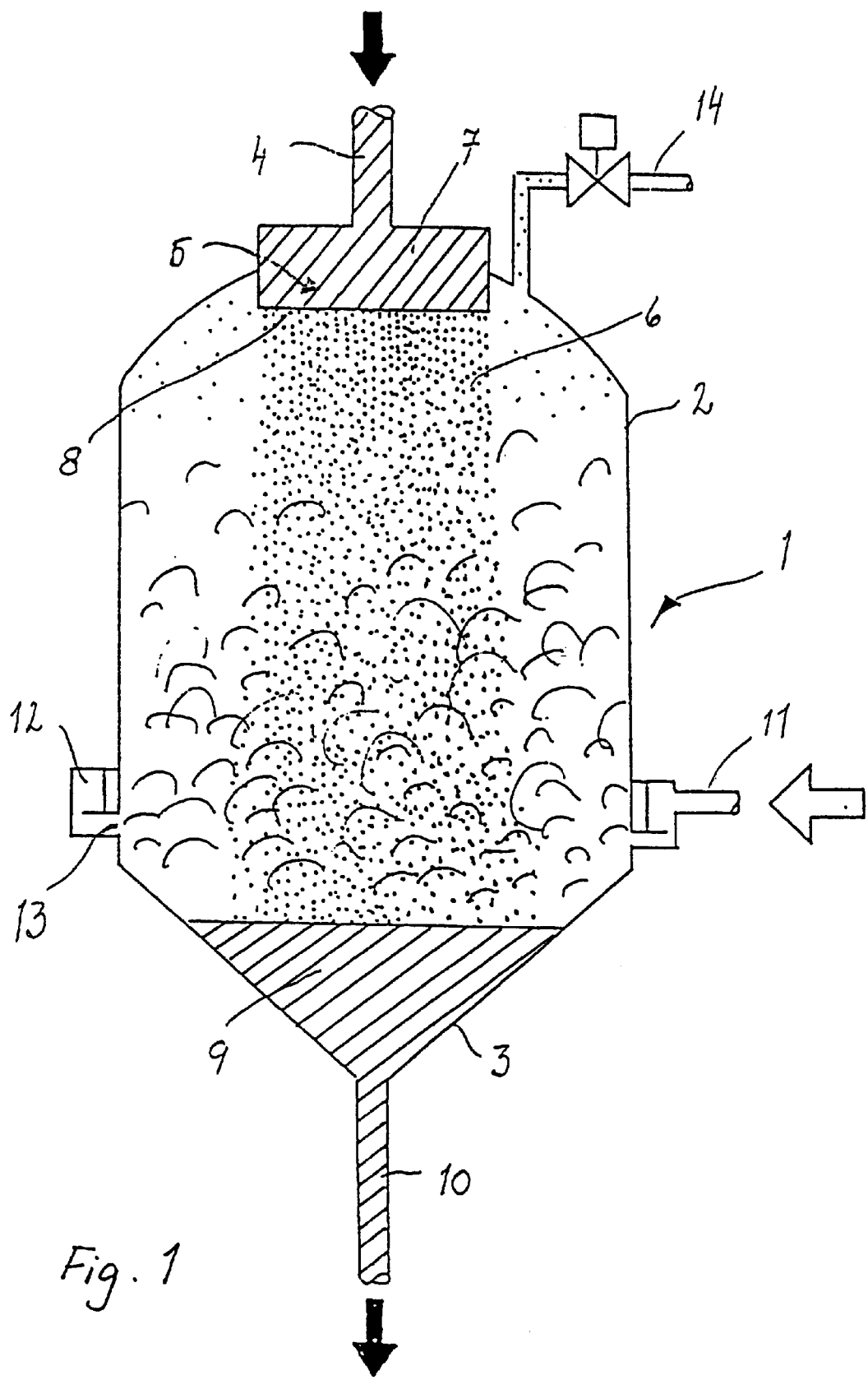
FIG. 1 is a side elevation, partly in section, of a state-of-the-art infusor.

FIG. 1 shows a state-of-the-art infusor 1. The infusor 1 includes an autoclave 2 with a conical bottom 3. In the upper region of the autoclave 2, there is disposed an inlet 4 for the product which is to be heat treated. The product may consist of any liquid dairy product such as milk, cream or yoghurt. In association with the product inlet 4, there is a device 5 for dividing the incoming product into small droplets 6. The device for finely dividing the product may, for example, consist of a distributor chamber 7 which, in its lower wall 8, has a large number of apertures or gaps.

The small product droplets 6 fall freely through the autoclave 2 and are re-accumulated in the conical bottom region 3 of the autoclave 2. Where the product re-accumulates, there is formed a relatively large liquid volume 9 before the product leaves the autoclave 2 through the outlet 10. Thereafter, the product is passed further to some form of buffer cell or pipe (not shown). In conventional infusors 1, an attempt is made to keep the liquid accumulation at a relatively constant level. The liquid accumulation may not become too small, since this may entail that heated product spatters on the inner walls of the autoclave 2, which may give rise to product burning on the walls.

The infusor 1 further includes an inlet 11 for steam. In FIG. 1, the steam inlet is placed in the lower region of the autoclave 2 and is disposed such that the steam spreads in the autoclave 2 through a concentric distributor chamber 12 and a concentric inlet gap 13. Alternatively, the steam inlet 11 may be placed in the upper region of the autoclave 2, in association with the product inlet 4.

The hot steam spreads within the autoclave 2 and the falling product droplets 6 meet the steam and are rapidly heated to the desired temperature. The heat treatment further includes the feature that the product is to be kept at this temperature for a given interval of time. Since it has not been possible to calculate the stay time in the large liquid volume 9, the stay time has instead been realised in that the product has passed a buffer pipe or buffer cell (not shown) placed after the infusor 1.

A conventional infusor 1 also includes some form of outlet 14 for the incondensable gases which are released in connection with the heating of the product. The infusor 1 is also provided with a number of pressure and temperature gauges for controlling the heat treatment process.

In order to avoid the large, uncontrollable liquid accumulation 9 which always occurs in conventional infusors 1, the infusor 1 according to the present invention (FIG. 2) has been provided with a conically shaped body 15. The body 15 should be as smooth as possible and is suitably an empty cavity in order to minimise weight. The body or cone 15 is designed such that it fills out the greater part of the space which constitutes the conical bottom 3 of the autoclave 2. The remaining space 16 in the bottom region 3 of the autoclave 2 constitutes a buffer cell. By avoiding the large "dead volume" which the liquid accumulation 9 entails in a conventional infusor, it is possible, as a result of the integrated buffer cell according to the present invention, to attain extremely short stay times for the product. Today, the intention is often—in order to improve the flavour of the product—that the product be treated at high temperature, approximately 150° C., during a very brief interval of time, of the order of 1–1.5 seconds.

At the upper edge of the cone 15, there are at least three guide stub shafts 17 distributed about its periphery. The guide stub shafts 17 reach the wall of the autoclave 2 and prevent the cone 15 from tilting.

Figure 2:
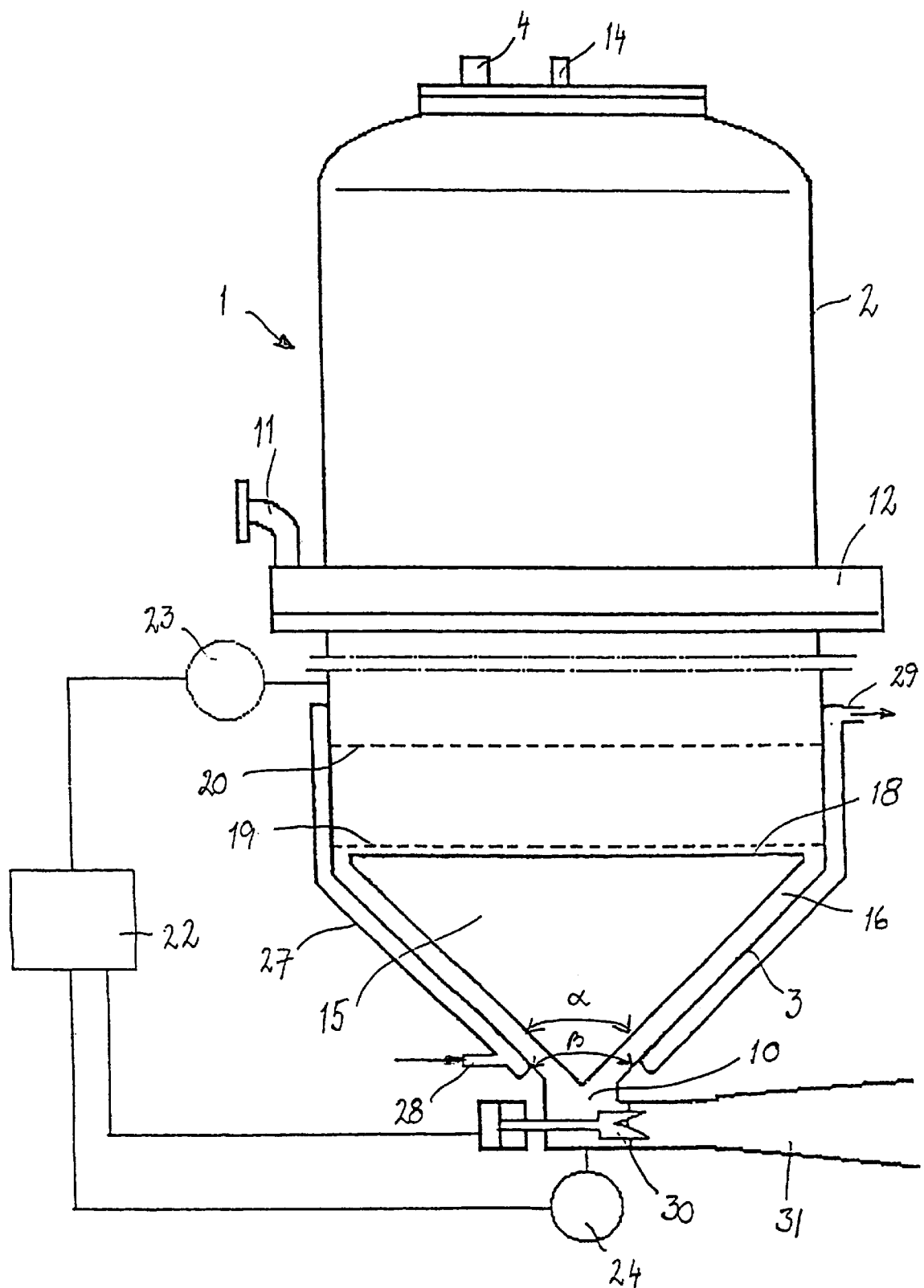
FIG. 2 is a side elevation, partly in section, of an infusor according to the present invention.
Figure 3:
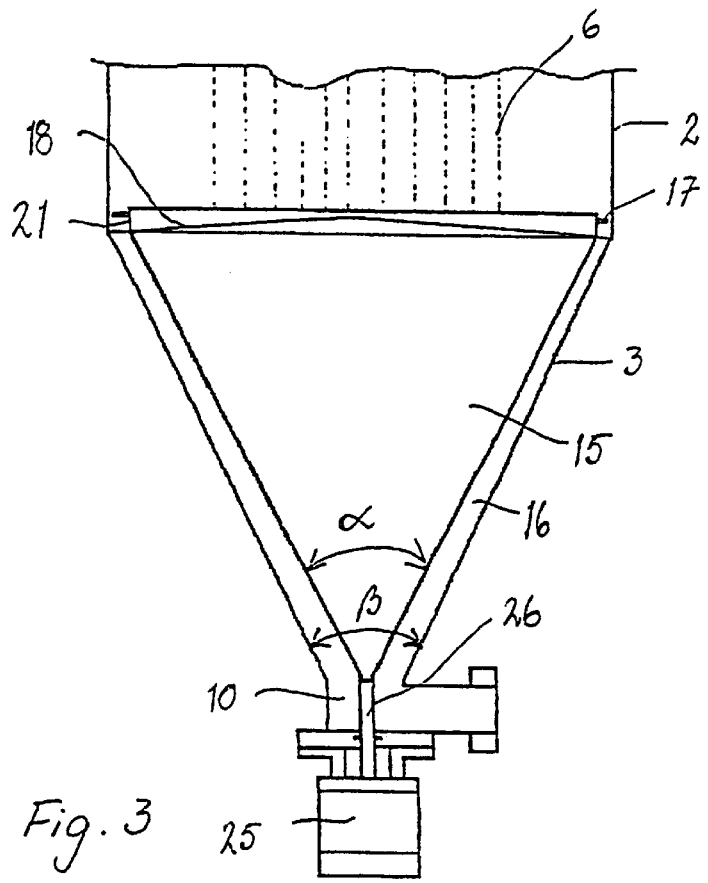
FIG. 3 is a side elevation, partly in section, of a first embodiment of the lower region of the infusor.
Figure 4:
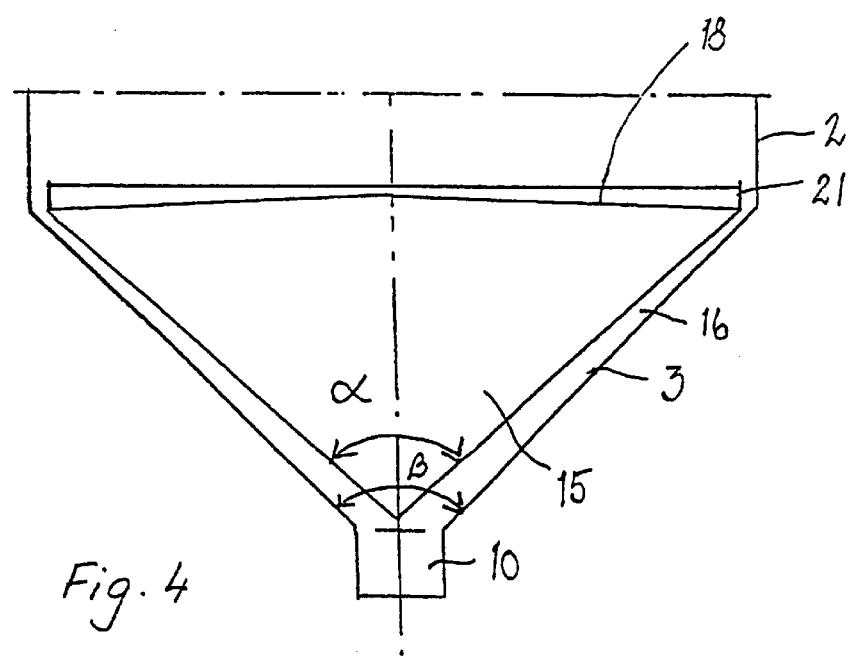
FIG. 4 is a side elevation, partly in section, of a second embodiment of the lower region of the infusor.

The cone angle $\alpha$ of the body 15 may be the same as the cone angle $\beta$ of the bottom 3, as is shown in FIG. 2. Alternatively, the cone angle $\alpha$ of the body 15 may be greater than the cone angle $\beta$ of the bottom 3 of the autoclave 2, as shown in FIGS. 3 and 4.

The volume which is accumulated in the space 16 may be mathematically calculated and, by dimensioning the cone angle $\alpha$ of the body 15 so that the desired flow will be obtained through the space 16, it is possible to compute an exact stay time for the product which passes through the space 16. By dimensioning the cone angle $\alpha$ of the body 15 so that it is larger than the cone angle $\beta$ of the bottom region 3, it is possible to obtain a constant liquid flow rate through the space 16.

The volume of the buffer cell is also to be calculated, and a certain slight volume must always exist above the cone 15. This is in order that the hot product does not burn fast, when the product droplets 6 reach the upper side 18 of the cone 15. Thus, the product will have a minimum liquid level 19, approximately 5–10 mm above the upper side 18 of the cone 15. A maximum liquid level 20 is also included.

By designing the upper side 18 of the cone 15 with a slight edge 21 approximately 5–10 mm above the upper side 18 of the cone 15, there will always be a liquid surface of 5–10 mm above the upper side 18 of the cone 15. Moreover, in FIGS. 3 and 4, the upper side 18 of the cone 15 has been angled gently from its centre and out towards the edge 21 in order to obtain a better flow of the product.

The stay time, i.e. the time interval during which the product is kept at a certain temperature, depends upon what stay volume is in the infusor. The stay volume may be varied in two ways or by a combination of the two alternatives. This is on the one hand by governing the liquid level which is controlled by measuring a differential pressure. The differential pressure measurement takes place in measurement equipment 22 which receives its measurement values from two pressure gauges 23 and 24. The one pressure gauge 23 is placed just above the maximum liquid level 20 and the other pressure gauge 24 is placed in the product outlet 10. By calculating a norm value for the differential pressure for each stay time, it is thus possible to steplessly regulate the stay time. A larger difference gives an increased volume. The volume is regulated between a minimum time interval when the liquid surface of the product is located at the minimum level 19, and a maximum time interval when the liquid surface of the product is located at the maximum level 20. The liquid level is governed by means of an outlet valve 30 placed in the product outlet 10.

Alternatively, the stay volume may be varied in that the liquid level 19, 20 is kept constant, but that the cone 15 is raised or lowered in the bottom region 3. This regulation may, for example, take place as shown in FIG. 3 by means of a switching device 25 which, via a spindle 26, raises or lowers the entire cone 15. The guide stub shafts 17 constantly ensure that the cone 15 keeps in the correct position and that it does not tilt sideways. By employing different cone angles b for the bottom portion 3 as shown in FIGS. 3 and 4, it is possible to some degree to modify the volume that constitutes the buffer cell.

By combining the two alternatives and allowing the liquid level 19, 20 to vary controlled by the differential pressure, at the same time as the body or cone 15 is raised or lowered by means of the switching device 25, it is possible to achieve a greater scope of regulation than afforded by both of the alternatives separately.

As is shown in FIG. 2, the conical bottom region 3 of the autoclave 2 may be made with a double wall 27. By supplying a coolant in an inlet 28 which may be evacuated through the outlet 29, deposition of coagulated product can be minimised without any appreciable cooling effect on the outflow temperature of the flow leaving the buffer cell.

Once the product has been ready heat-treated, i.e. it is heated to a certain predetermined temperature and has been kept at this temperature for a given predetermined time interval, the product must be cooled as rapidly as possible. A simple method of rapidly cooling the product is shown in FIG. 2. Having passed the outlet 10 and the outlet valve 30, the product enters into an expansion cooler 31. Given that the space occupied by the product rapidly expands, the pressure falls and the temperature will decrease. Thereafter the product is passed direct into a vacuum vessel 32.

Figure 5:
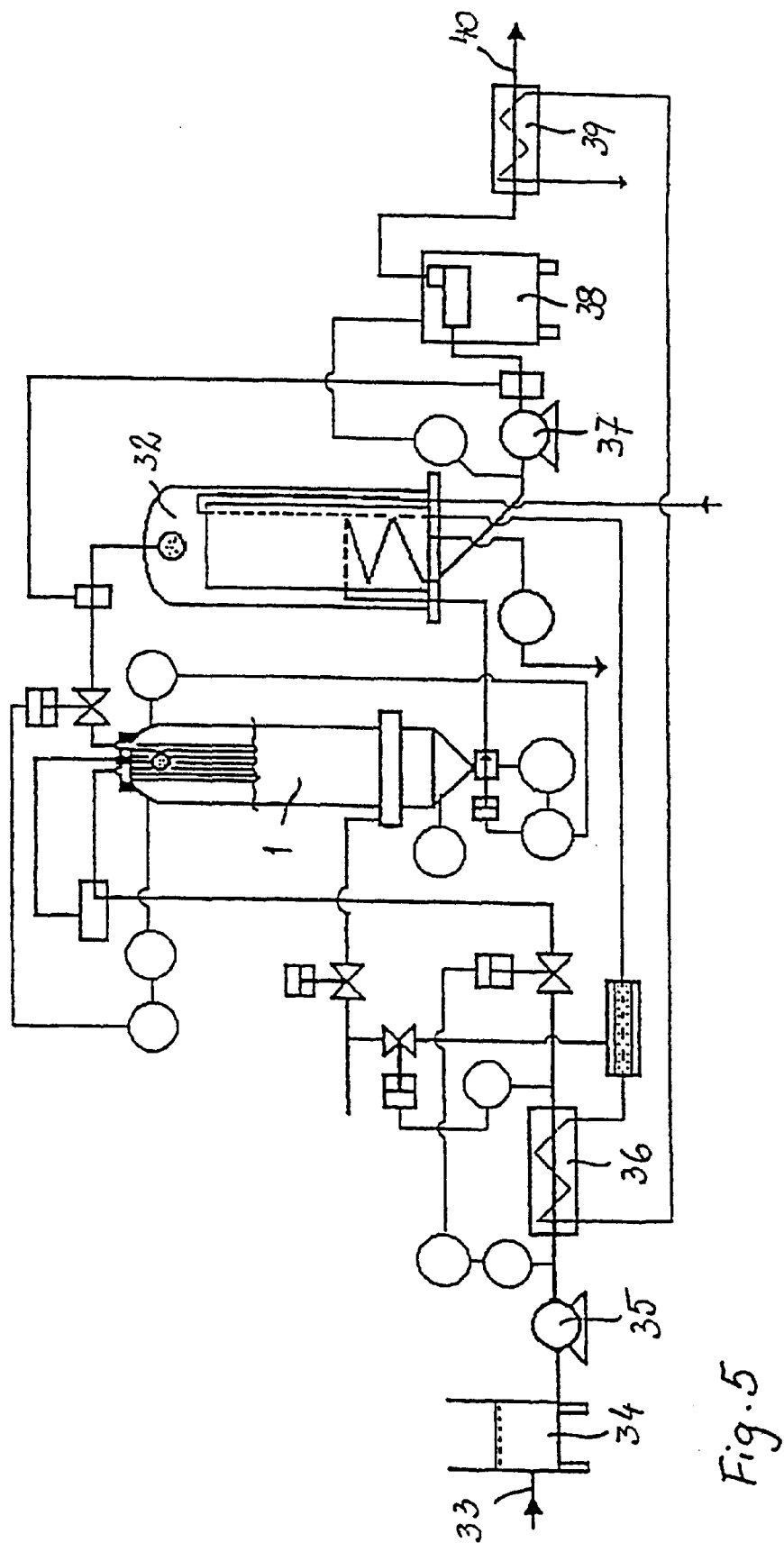
FIG. 5 is a flow diagram for a plant for heat treatment by means of infusion heat.

FIG. 5 shows how an infusor 1 is included as a component in a complete plant for the heat treatment of a liquid food product by means of infusion heat. The incoming product 33 passes into the plant via a balance tank 34 and a pump 35. In a heat treatment unit 36, normally a plate heat exchanger, the product is pre-heated to the desired temperature, normally 75–82° C., but also temperatures of up to 120° C. may occur. The thus pre-heated product is led in a conduit into the infusor 1 and is heated treated there in the above-described manner.

The ready-treated product is led from the infusor 1 to a vacuum vessel 32 where the addition of water which the product received as a result of the infusion heating is once again removed. Via a pump 37 and possibly a homogenizer 38, the product is led further to a cooler 39, for example a plate heat exchanger, where it is cooled to the desired temperature. The product then departs from the plant through a conduit 40 for further treatment or for final packing into consumer packages.

As will have been apparent from the foregoing description, the present invention realises an apparatus in an infusor which entails that a regulatable buffer cell is integrated in the infusor. The stay volume can be controlled and the uncontrollable liquid volume which is formed in the bottom of conventional infusors is avoided. As a result of the present invention, it is simpler to calculate exact stay times for the product and thereby reduce the thermal shock to which the product is subjected, which makes a favourable contribution to the flavour of the product.

What is claimed is:

1. An apparatus in an infusor for a liquid food product, of the type which includes an autoclave with a conical bottom, the autoclave having an inlet for the product located in its upper region, the inlet being disposed to divide the incoming product into the autoclave into small droplets, the infusor further including an outlet for the product located in the lower region of the autoclave, as well as an inlet for steam, wherein the conical bottom of the autoclave is filled for the greater part by a conically shaped body, and that the remaining space in the bottom of the autoclave constitutes a buffer cell.

2. The apparatus as claimed in claim 1, wherein the stay volume of the product consists of that product which stays in the space up to a liquid level above the upper side of the body.

3. The apparatus as claimed in claim 2, wherein the stay volume may be varied in that the liquid level may vary between a minimum level and a maximum level.

4. The apparatus as claimed in claim 3, wherein the liquid level is regulated by means of an outlet valve placed in the product outlet; and that the outlet valve is controlled by a differential pressure between the pressure measured by a pressure gauge placed in the product outlet and the pressure measured by a pressure gauge placed above the maximum level.

5. The apparatus as claimed in claim 3, wherein the stay volume may be varied in that the conical body may be moved upwards or downwards in the conical bottom of the autoclave by means of a switching device.

6. The apparatus as claimed in claim 2, wherein the stay volume may be varied in that the liquid level may vary between a minimum level and a maximum level at the same time as the conical body may be moved upwards or downwards in the conical bottom of the autoclave by means of a switching device.

7. The apparatus as claimed in claim 2, wherein the upper side of the body is angled from the center and out towards its periphery.

8. The apparatus as claimed in claim 2, wherein the upper side of the body is provided with an edge along its periphery.

9. The apparatus as claimed in claim 1, wherein the body is disposed to be kept in position in the conical bottom by means of guide stub shafts.

10. The apparatus as claimed in claim 1, wherein the body has a cone angle $\alpha$ which is greater than the cone angle $\beta$ of the conical bottom.

* * * * *